United States Patent
Cheatham et al.

(10) Patent No.: US 6,968,594 B2
(45) Date of Patent: Nov. 29, 2005

(54) LIQUID EXTRACTION MACHINE WITH TOW ASSEMBLY

(75) Inventors: Sean A. Cheatham, Grover, MO (US); Trent A. Fulghum, Fayetteville, AR (US)

(73) Assignee: Alto U.S. Inc., Chesterfield, MO (US)

( * ) Notice: Subject to any disclaimer, the term of this patent is extended or adjusted under 35 U.S.C. 154(b) by 448 days.

(21) Appl. No.: 10/271,017

(22) Filed: Oct. 15, 2002

(65) Prior Publication Data

US 2003/0163886 A1 Sep. 4, 2003

(Under 37 CFR 1.47)

Related U.S. Application Data

(60) Provisional application No. 60/329,370, filed on Oct. 15, 2001.

(51) Int. Cl.[7] .................................................. A47L 7/00
(52) U.S. Cl. ......................... 15/320; 15/340.2; 280/1.5
(58) Field of Search ............................... 15/320, 340.1, 15/340.2, 340.3, 340.4; 280/1.5

(56) References Cited

U.S. PATENT DOCUMENTS

| | | |
|---|---|---|
| 1,507,982 A | 9/1924 | Anderson |
| 2,366,231 A | 1/1945 | Armstrong |
| 2,613,953 A | 10/1952 | Giovannoni |
| 3,837,028 A * | 9/1974 | Bridge ........................ 15/50.1 |
| 4,139,922 A | 2/1979 | Fitch |
| 4,167,799 A | 9/1979 | Webb |
| 4,236,723 A | 12/1980 | Lemmon |
| 4,619,010 A | 10/1986 | Burgoon |
| 5,215,318 A | 6/1993 | Capraro |
| 5,454,138 A * | 10/1995 | Mondigo et al. .............. 15/354 |
| 5,511,802 A | 4/1996 | Aitken |
| 5,659,918 A * | 8/1997 | Anthony et al. ............... 15/320 |
| 5,797,163 A * | 8/1998 | Whitaker et al. ............. 15/413 |
| 5,947,490 A * | 9/1999 | Munnoch et al. .......... 280/32.7 |

* cited by examiner

Primary Examiner—Terrence R. Till
(74) Attorney, Agent, or Firm—Blackwell Sanders Peper Martin LLP

(57) ABSTRACT

An extraction machine for cleaning a floor surface has a front and a rear and is movable by an operator relative to the floor surface in a forward direction of travel to clean the floor surface. The extraction machine also has a cleaning solution dispenser capable of dispensing a cleaning solution onto the floor surface and a recovery system for extracting a dirty solution from the floor surface. A towline is connected at one end to the extraction machine and is configured for being supported by the operator at an opposite end thereof such that movement of the operator in the forward direction of travel causes tensioning of the towline. The tension in the towline applies a pulling force to the extraction machine to move the extraction machine in the forward direction of travel.

16 Claims, 4 Drawing Sheets

LIQUID EXTRACTION MACHINE WITH TOW ASSEMBLY

CROSS REFERENCE TO RELATED APPLICATIONS

This application claims priority of U.S. Provisional Patent No. 60/329,370, filed Oct. 15, 2001.

BACKGROUND OF INVENTION

This invention relates generally to a floor surface treatment machine used for treating floor surfaces, and more particularly to an extraction machine used for cleaning floor surfaces with a liquid cleaning solution and then extracting dirty solution from the floor surface, and even more particularly to such an extraction machine which is pulled, or towed, by an operator to move over the floor surface during operation of the machine to clean the floor surface.

Extraction machines of conventional design have a cleaning solution tank contained in the machine housing, and a cleaning solution dispenser for dispensing cleaning solution from the tank onto a floor surface to be cleaned, such as a carpet. The cleaning solution is typically a pre-mixed solution comprised of water and a liquid or powder cleaning agent and is sprayed onto the carpet through one or more spray nozzles. A scrub brush, driven by a brush motor, agitates the cleaning solution and works the solution into the carpet to effect cleaning of the carpet, leaving a dirty solution within the carpet. The extraction machine also includes a recovery system for extracting the dirty solution from the floor surface. The recovery system typically includes a vacuum shoe mounted on the machine and adapted for engaging the floor surface to receive dirty solution suctioned into the recovery system. The dirty solution is drawn by the recovery system from the vacuum shoe into a recovery tank disposed in the machine housing.

Extraction machines are conventionally supported by a pair of wheels to facilitate movement of the machine over the floor surface in a forward direction of travel along which cleaning solution is first dispensed onto a segment of the floor surface to be cleaned, the scrub brush then passing over the segment to clean the floor surface, following which the vacuum shoe passes over the segment to extract dirty solution from the floor surface. Because of the relatively small size of some currently available extraction machines, these machines lack any drive system for driving the wheels to self-propel the machine over the floor surface. Instead, an operator must grasp a handle mounted on the front of the extraction machine and pull the handle while walking in the forward direction of travel of the machine to pull the machine over the floor surface.

One disadvantage of such a machine is that the physical effort required to pull the machine results in fatigue of the operator's arms, shoulders and back.

SUMMARY OF INVENTION

Among the several objects and features of the present invention is the provision of an extraction machine for cleaning a floor surface, such as carpeting, capable of being towed by an operator in a forward direction of travel to clean the floor surface; and the provision of such an extraction machine and a method for towing the extraction machine which reduces fatigue of the operator's arms, shoulders and back.

In general, an extraction machine of the present invention for cleaning a floor surface has a front and a rear and is movable by an operator relative to the floor surface in a forward direction of travel to clean the floor surface. The extraction machine has a cleaning solution dispenser capable of dispensing a cleaning solution onto the floor surface and a recovery system engageable with the floor surface during operation of the machine to extract a dirty solution from the floor surface. The cleaning solution dispenser is nearer the front of the extraction machine than the recovery system such that as the extraction machine is moved over a segment of the floor surface in the forward direction of travel of the machine the cleaning solution dispenser passes over the segment and dispenses cleaning solution onto the floor surface to promote the removal of dirt therefrom and the recovery system subsequently passes over the segment of floor surface to extract dirty solution from the floor surface. A tow assembly is provided for use by the operator to pull the machine in the forward direction of travel. The tow assembly generally comprises a towline connected at one end to the extraction machine and configured for being supported by the operator at an opposite end thereof such that movement of the operator in the forward direction of travel causes tensioning of the towline. The tension in the towline applies a pulling force to the extraction machine to move the extraction machine in the forward direction of travel to clean the floor surface.

A method of the present invention for towing an extraction machine of the type for cleaning a floor surface generally comprises connecting one end of a towline to the front of the extraction machine and supporting an opposite end of the towline above the floor surface. The opposite end of the towline is pulled generally in the forward direction of travel of the extraction machine to thereby tension the towline. The tension in the towline applies a pulling force to the extraction machine for towing the machine in the forward direction of travel thereof.

Other objects and features will become in part apparent and in part pointed out hereinafter.

BRIEF DESCRIPTION OF DRAWINGS

Corresponding parts are designated by corresponding reference characters and numerals throughout the several views of the drawings.

DETAILED DESCRIPTION

Figure 1:
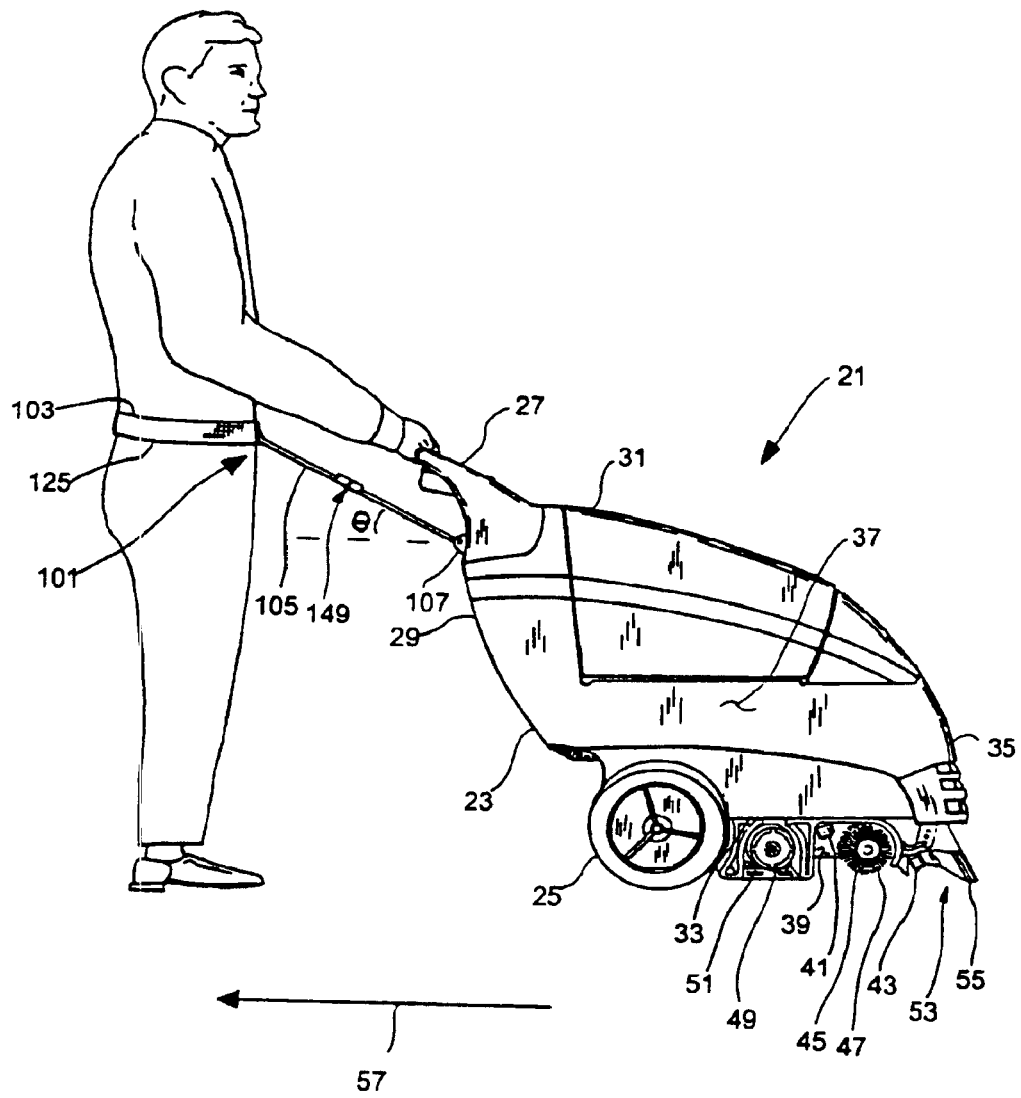
FIG. 1 is a side view of an extraction machine of the present invention being towed by an operator via a tow assembly.

Referring now to FIG. 1, an extraction machine for cleaning floor surfaces, such as carpeting, is indicated in its entirety by the reference numeral 21. The extraction machine 21 comprises a main housing, indicated generally at 23, mounted on wheels 25 so the machine can readily be moved by an operator. A handle 27 mounted the housing 23 at the front 29 of the extraction machine 21 at the uppermost extent thereof provides the operator with a convenient means for guiding and maneuvering the extraction machine during operation. Suitable controls (not shown) on the handle 27 are provided for activating various operating components of the machine.

The main housing 23 has the front 29, a top 31, a bottom 33, a rear 35 and sides 37 (one of which is shown in FIG. 1). portions of which define a solution tank (not shown) within the main housing for containing a cleaning solution. Various operating components of the extraction machine 21 are also disposed in the main housing, and in a brush housing 39 depending from the main housing. One or more spray nozzles 41 are spaced laterally across the bottom of the brush housing 39 and are in fluid communication with the solution tank for dispensing cleaning solution from the tank onto the floor surface. A second set of nozzles 43 is located beneath the main housing 23 for directing additional cleaning solution onto the floor surface.

A rotary scrub brush 45 is mounted for rotation within the brush housing 39 between the first and second sets of nozzles 41,43. The brush 45 has bristles 47 which contact the surface to be cleaned and is located close to the spray nozzles 41 to encourage interaction between the scrub brush and the cleaning solution 43. The scrub brush 45 is driven by a brush motor 49 located in a compartment 51 in the brush housing 39 to effect a scrubbing action with the cleaning solution to agitate the cleaning solution and promote removal of dirt from the floor surface. As dirt is removed, it attaches itself to the cleaning solution to leave a dirty solution on the surface of the floor.

The extraction machine 21 has a recovery system, generally indicated at 53, comprising a vacuum pump (not shown) mounted in the main housing 23 directly below a solution recovery tank (not shown). A vacuum shoe 55 is attached to the underside of the main housing 23 in fluid communication with the vacuum pump and the solution recovery tank and engages the floor surface so that the shoe and wheels 25 combine to support the extraction machine 21 in a generally upright position, with the center of mass of the machine located to the rear of the wheel axis. The shoe 55 has a centrally located opening (not shown) extending upwardly therethrough and is in fluid communication with the solution recovery tank via a flexible recovery line or hose (not shown) connected to the recovery tank.

In operation of the extraction machine 21 to clean a floor surface, the machine is pulled by the operator in a forward direction of travel (e.g., to the left as indicated by the direction arrow 57 in FIG. 1). As the extraction machine 21 is pulled forward over a segment of the floor surface to be cleaned, cleaning solution is dispensed onto the floor surface via the first set of spray nozzles 41. The rotary scrub brush 45 then passes over the dispensed cleaning solution and works the cleaning solution against the floor to clean the floor surface, thereby creating a dirty solution. Additional cleaning solution is dispensed by the second set of nozzles 43 onto the segment of floor surface being cleaned to further entrain dirt within the dirty solution. The vacuum shoe 55, positioned toward the rear of the machine 21. subsequently passes over the segment of floor surface, and the recovery system 53 suctions the dirty solution from the floor surface into the vacuum shoe and delivers the dirty solution to the recovery tank.

Construction and operation of the extraction machine set forth above is generally known to those skilled in the art and will not be further described herein except to the extent necessary to disclose the present invention. As an example, a particularly preferred extraction machine is shown and described in co-assigned U.S. Pat. No. 5,797,163, the entire disclosure of which is in corp rated herein by reference, and is manufactured and sold by Alto U.S., Inc. of Springdale, Ark, U.S.A. under the model designations IMAGE 16i, IMAGE 16ix, IMAGE 20i and IMAGE 20ix.

Still referring to FIG. 1, the extraction machine 21 of the present invention further comprises a tow assembly, generally indicated at 101, configured for connection with the front 29 of the extraction machine for use by the operator in towing (e.g., pulling) the extraction machine in the forward direction of travel during operation of the machine to clean the floor surface. The tow assembly 101 comprises a belt 103 configured for wearing about the operator's waist, and a towline 105 connecting the belt with the front 29 of the extraction machine 21 whereby movement of the operator generally in the forward direction of travel of the extraction machine tensions the towline, e.g., via the belt worn by the operator, to pull the extraction machine over the floor surface as will be described.

Figure 2:
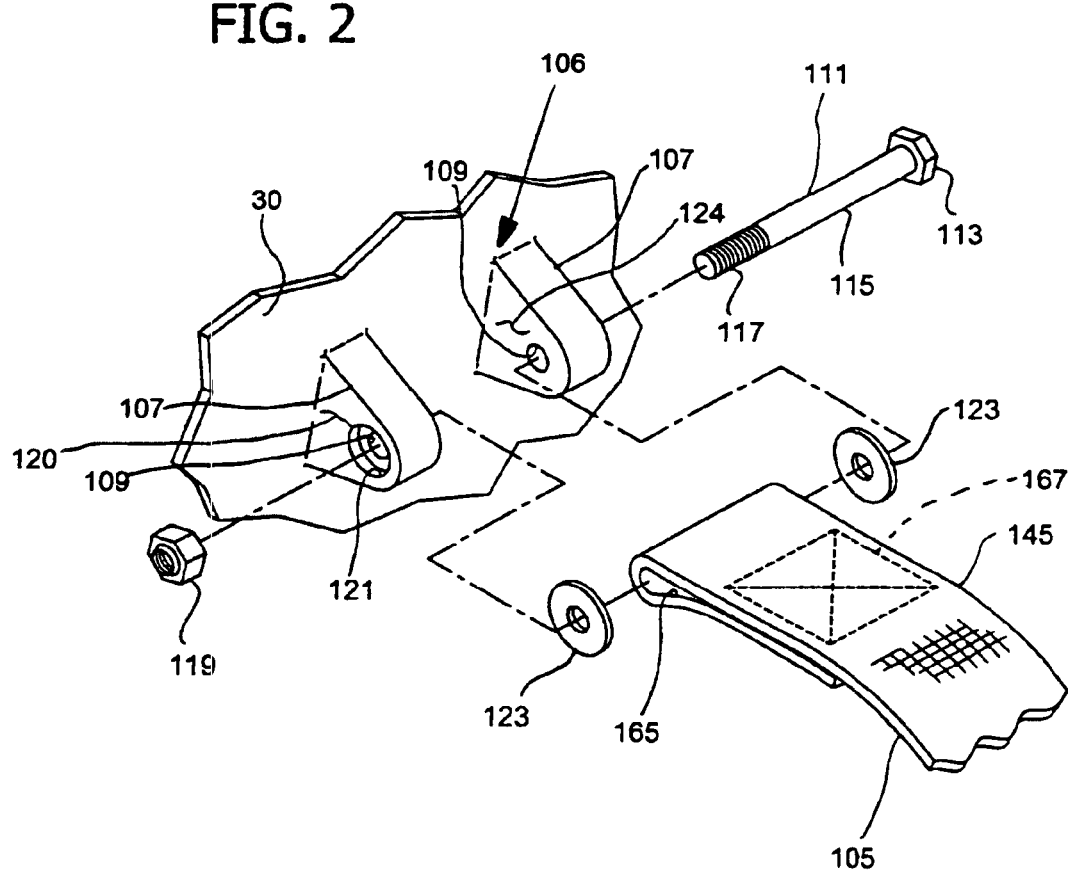
FIG. 2 is an exploded view of a portion of the front of the extraction machine of FIG. 1 showing connection of the tow assembly with the extraction machine.

With particular reference to FIG. 2, a connecting assembly, generally indicated at 106, for pivotally connecting the towline 105 to the extraction machine 21 comprises a pair of mounting brackets 107 secured to the front 29 of the extraction machine 21, such as by being formed integrally with a front wall 30 (FIG. 2) of the machine, at a location below the handle 27. The brackets 107 project out (e.g., forward) from the front 29 of the machine 21 in generally parallel, spaced relation with each other. Each bracket 107 has an opening 109 therein sized for receiving a bolt 111 that extends laterally between the brackets for use in securing the towline 105 to the extraction machine 21.

The bolt 111 has a head 113 sized larger than the bracket openings 109, and a shank 115 with a threaded end 117 on which a lock nut 119 is threaded to secure the bolt 111 on the extraction machine 21. Generally circular counterbores 121 (one of which is shown in FIG. 2) are formed in outer surfaces 120 of the mounting brackets 107 for respectively receiving the head 113 of the bolt 111 and the lock nut 119. Washers 123 are mounted on the shank 117 of the bolt 111 generally adjacent inner surfaces 124 of the mounting brackets 107.

It is understood that the mounting brackets 107 of the connecting assembly 106 may be formed separate from the extraction machine and secured thereto, such as by fasteners (not shown), without departing from the scope of this invention. Forming the connecting assembly 106 separate from the extraction machine 21 allows existing extraction machines to be retrofit with the connecting assembly for using the tow assembly 101. It is also contemplated that the connecting assembly 106 may comprise other than mounting brackets 107 and a bolt 111, such as one or more rings (not shown) or other suitable mounts (not shown) capable of being secured to the extraction machine, without departing from the scope of this invention.

Figure 3:
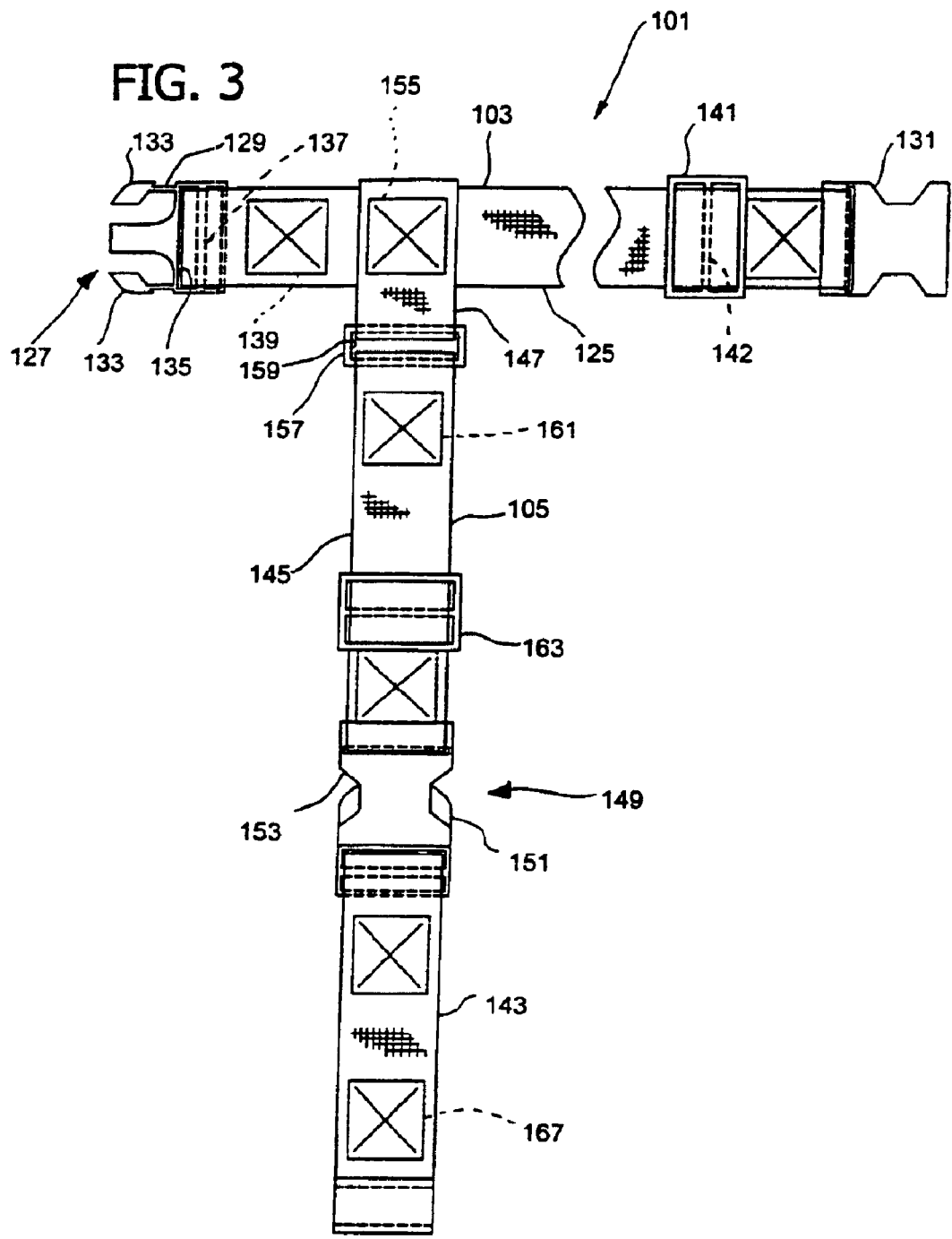
FIG. 3 is a top plan view of the tow assembly shown disconnected from the extraction machine and laid flat.

As shown in FIG. 3, the belt 103 comprises an elongate strap 125 sized to encircle an operator's waist, and a quick-disconnect coupling, generally indicated at 127, having male and female connectors 129, 131 attached to opposite ends of the belt for releasably securing the belt about the operator's waist. The quick-disconnect coupling 127 of the illustrated embodiment is a conventional coupling in which the male connector 129 has flexible, resilient prongs 133 for snap-in, releasable connection with the female connector 131. However, it is understood that other couplings may be used to releasably secure the ends of the belt 103 together. It is also understood that the ends of the belt 103 may be secured together other than by couplings,. such as by a conventional belt buckle arrangement or other suitable securements, or by being tied together, without departing from the scope of this invention.

Figure 4:
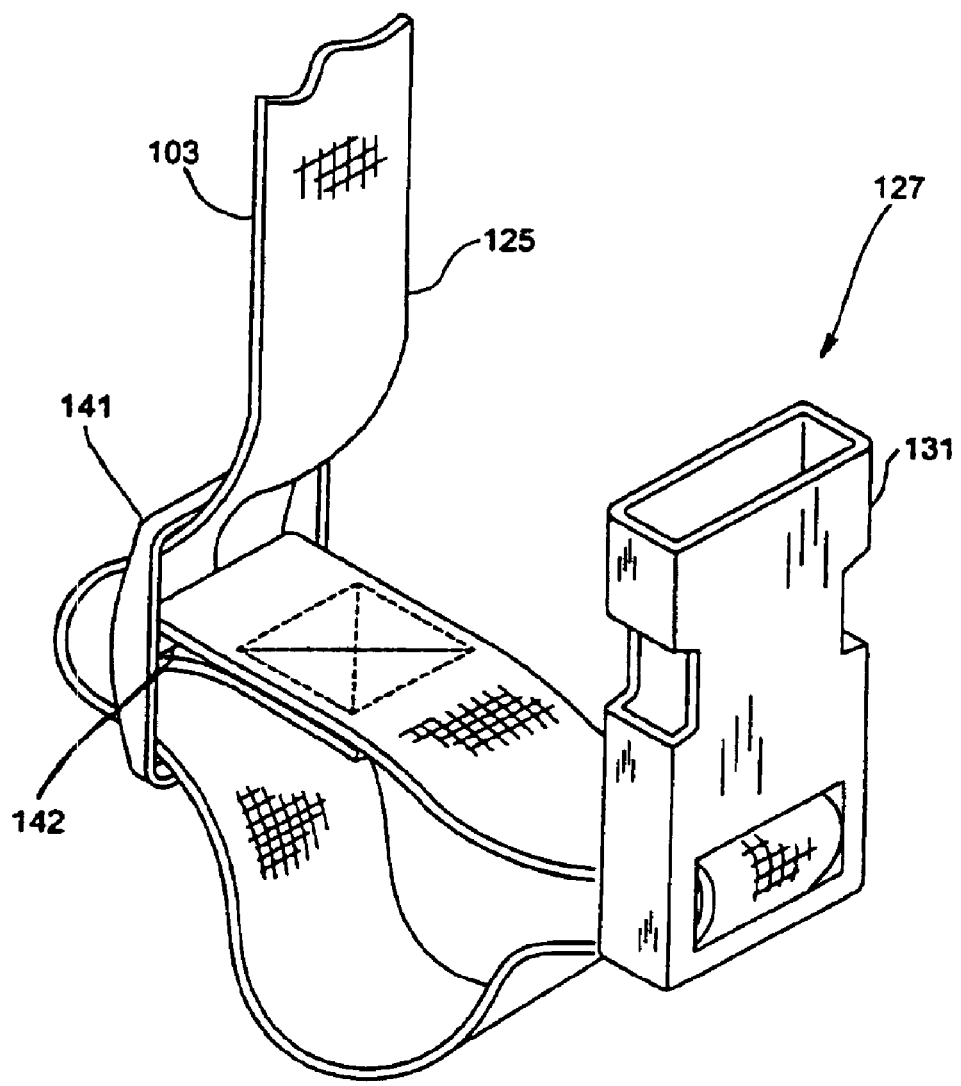
FIG. 4 is a schematic of a portion of the tow assembly illustrating the assembly thereof.

The male connector 129 of the quick-disconnect coupling 127 is secured to the belt strap 125 by looping the end of the strap through an opening 135 formed in the connector, then over a cross-member 137, then back through the opening into overlapping relationship with a trailing portion of the strap. The overlapped portions of the strap are then secured together, such as by stitching 139. As seen best in FIG. 4, an adjustment buckle 141 is slidably retained on the belt strap 125 toward the other end of the strap for use in adjusting the length of the belt 105 (e.g., between the connectors 129, 131). The female connector 131 of the quick-disconnect coupling 127 is also slidably received on the strap 125, longitudinally outward of the buckle 141, and the end of the strap is secured to a cross-member 142 of the adjustment buckle. As a result, the portion of the strap 125 longitudinally outward of the adjustment buckle 141 generally forms a loop on which the female connector 131 is slidably retained.

To adjust the length of the belt 125, the adjustment buckle 141 is slid along the belt strap 125 intermediate the connectors 129,131 to move the end of the belt strap relative to the rest of the strap. As the end of the belt strap 125 connected to the adjustment buckle 141 slides closer to the male connector 129, the loop on which the female connector 131 is retained is lengthened, thereby shortening the overall length of the belt 103.

The belt strap 125 is preferably constructed of polypropylene or nylon, although other strap materials are contemplated to be within the scope of this invention. The male and female connectors 129, 131 of the quick-disconnect coupling 127 are preferably constructed of plastic. The length of the belt 103, e.g., from the male connector 129 to the female connector 131 of the quick-disconnect coupling 127, is desirably in the range of about 25 inches to about 65 inches, and more desirably in the range of about 35.5 inches to about 57 inches, and the width of the belt strap is approximately two inches. However, it is understood that the length and/or the width of the belt 103 may vary and remain within the scope of this invention. It is also contemplated that the male connector 129, rather than the female connector 131, may be slidably received on the belt strap 125 without departing from the scope of this invention.

The towline 105 in FIG. 3 extends transversely out from the belt strap 125 generally adjacent the male connector 129 of the quick-disconnect coupling 127 of the belt. As shown in FIG. 1, the towline 105 is preferably connected to the front 29 of the extraction machine 21 sufficiently below the handle 27 such that the height at which the towline is connected to the extraction machine is at least equal to, and is more preferably lower than, the height of the operator's waist about which the belt 103 is worn. However, the towline 105 may instead be connected to the handle 27 or to the top 31 of the extraction machine 21 and remain within the scope of this invention. As an example, the extraction machine 21 of the illustrated embodiment is approximately 46 inches long and is approximately 36 inches tall from the floor to the handle 27 of the machine. The towline 105 is desirably connected to the extraction machine 21 in the range of about zero inches to about twenty inches, and more desirably about 8.375 inches, below the handle 27, i.e., in the range of about 36 inches to about sixteen inches above, and more desirably about 27.625 inches, above the floor surface.

Consequently, where the operator's waist is at least about 27.625 inches above the floor, tensioning of the towline 105 upon movement of the operator in the forward direction of travel of the extraction machine 21 results in the towline extending out and preferably up from the extraction machine to the belt 103 worn by the operator and generally defines an angle $\Theta$ relative to horizontal. The angle $\Theta$ of the towline 105 during tensioning thereof is preferably in the range of about 0° to about 50°, and more preferably in the range of about 1° to about 50° and most preferably a range of about 30° to about 45°. However, it is contemplated that the angle $\Theta$ of the towline 105 may exceed 50° without departing from the scope of this invention, as long as the handle 27 of the machine 21 does not interfere with proper extension of the towline.

Referring again to FIG. 3, the towline 105 of the illustrated embodiment is constructed of three individual strap segments 143, 145, 147, one strap segment 143 secured to the front 29 of the extraction machine 21 and the other two segments 145, 147 secured to the belt 103, and a quick-disconnect coupling, generally indicated at 149, for releasably securing the one segment 143 with the other two segments 145, 147 to releasably connect the tow assembly 101 with the extraction machine. The quick-disconnect coupling 149 is substantially identical to the coupling 127 of the belt 103.

Strap segment 147 is folded over on itself to form a loop (not shown), and the overlapping portions of the segment overlay the width of the belt strap 125 generally adjacent the male connector 129 of the quick-disconnect coupling 127. The overlapping portions of the segment 147 are then secured to the belt strap 125, such as by suitable stitching 155, to extend transversely out from the strap. A generally rectangular ring 157 having a central opening 159 is retained on the loop formed by the strap segment 147 and is also secured to one end of the second strap segment 145 by looping the strap segment through the central opening of the ring and back over on itself, and then securing the overlapped portions of the segment together, such as by suitable stitching 161.

An adjustment buckle 163 and a female connector 153 of the quick-disconnect coupling 149 are slidably retained on the second strap segment 145, e.g., in substantially the same manner that the buckle 141 and female connector 131 of the belt 103 are retained on the belt strap 125, to permit selective adjustment of the length of the strap segment to thereby adjust the length of the towline 105.

The remaining strap segment 143 has a loop 165 (FIG. 2) formed at one end thereof by folding the segment over upon itself and securing the overlapped portions of the segment together, such as by suitable stitching 167. The loop 165 is sized for loosely receiving the bolt 111 therethrough, between the washers 123, to pivotally connect the strap segment 143 to the front 29 of the extraction machine 21. Pivotally connecting the towline 105 to the extraction machine 21 permits the tow assembly 101 to be used by persons of varying heights (e.g., having waists at different heights above the floor surface). A male connector 151 of the quick-disconnect coupling 149 is secured to the other end of the strap segment 143 in substantially the same manner that the male connector 129 is secured to the belt strap 125.

While the towline 105 is shown and described herein as being secured to the belt strap 125 generally adjacent the male connector 129 of the quick-disconnect coupling 127, it is understood that the towline may be secured to the belt strap at substantially any longitudinal position along therapy. It is also understood that the towline 105 may be constructed of more or less than three strap segments 143, 145, 147 without departing from the scope of the invention. For example, the towline 105 may be constructed of two strap segments (not shown), with one segment secured to the belt strap 125 and the other secured to the extraction machine 21, so that the coupling 157 can be omitted.

Alternatively, the towline 105 may be a single strap (not shown) having one end secured to the belt strap 125 and a connector of the quick-disconnect coupling 149 secured to the other end, with a mating connector being secured to the extraction machine 21 other than by a strap, such as by being mounted directly on or integrally formed with the extraction machine. It is also contemplated that the quick-disconnect coupling 149 of the towline 105 may be omitted altogether, so that the belt 103 and towline 105 are fixedly secured to the extraction machine 21, without departing from the scope of this invention. Also, the towline 105 need not be constructed of strapping, but may instead be constructed of rope, chain or any suitable type of line.

The three strap segments 143, 145, 147 of the towline 105 shown in FIG. 3 are each constructed of the same material as the belt strap 125, e.g., polypropylene or nylon, and have a width of about two inches. As an example of the towline 105 dimensions, the length of the towline (e.g., from the belt to the extraction machine) is desirably in the range of about ten inches to about thirty inches, and is more desirably about eighteen inches. As an additional example, towline 105 of the illustrated embodiment is about eighteen inches, with the one strap segment 147 of the towline being about three inches in length (two inches of which overlay the width of the belt strap 125), the maximum length of the second strap segment 145 being about seven inches and the length of the other strap segment 143 also being about 7.5 inches. The coupling 157 and the quick-disconnect coupling 149 comprise the remaining length of the towline 105.

In accordance with a method of the present invention, the operator places the belt 103 of the tow assembly 101 around the operator's waist and connects the male and female connectors 129, 131 of the quick-disconnect coupling 127. The operator can use the adjustment buckle 141 retained on the belt strap 125 to adjust the length of the belt 103, either before or after the belt is placed around the operator's waist, so that belt fits snug around the waist. If the strap segments 143, 145 of the towline 105 are not already connected together, the male and female connectors 151, 153 of the towline are then connected to releasably secure the tow assembly 101 to the extraction machine 21. Using the adjustment buckle 163 retained on the strap segment 145 of the towline 105, the operator can adjust the length of the towline so that when the towline is pulled taut, the operator can still comfortably reach the handle 27 of the extraction machine 21.

Operation of the extraction machine 21 is then initiated and, with the operator's hands grasping the handle 27, the operator walks in the forward direction of travel of the extraction machine (e.g., the operator walks backward, or to the left, as indicated in FIG. 1). The towline 105, connecting the belt 103 to the extraction machine 21, is tensioned and thereby pulls the extraction machine to move in the forward direction of travel for cleaning the floor surface in the previously described manner. Because the towline 105 is supported by the belt 103 worn around the wearer's waist at a height greater than the height at which the towline is connected to the extraction machine 21, the tensioned towline extends out and up from the front 29 of the extraction machine to the belt at the angle Θ.

As a result of the towline 105 being tensioned at the angle Θ, the tension in the towline 105 applies both a forward, or pulling force and an upward, or lifting force to the front 29 of the extraction machine 21 via the bolt 111 and mounting brackets 107. The pulling force tows the machine 21 over the floor surface in the forward direction of travel thereof while the lifting force reduces the amount of extraction

What is claimed is:

1. An extraction machine for cleaning a floor surface, the extraction machine having a front and a rear and being movable by an operator relative to the floor surface in a forward direction of travel to clean the floor surface, the extraction machine comprising:
   a cleaning solution dispenser capable of dispensing a cleaning solution onto the floor surface;
   a recovery system for extracting a dirty solution from the floor surface, wherein the cleaning solution dispenser being nearer the front of the extraction machine than the recovery system such that as the extraction machine is moved over a segment of the floor surface in the forward direction of travel of the machine the cleaning solution dispenser passes over the segment and dispenses cleaning solution onto the floor surface to promote the removal of dirt therefrom and the recovery system subsequently passes over the segment of floor surface to extract dirty solution from the floor surface; and
   a tow assembly for use by the operator to pull the machine in the forward direction of travel, the tow assembly comprising a towline connected at one end to the extraction machine and configured for being supported by the operator at an opposite end thereof such that movement of the operator in the forward direction of travel causes tensioning of the towline whereby the tension in the towline applies a pulling force to the extraction machine to move the extraction machine in the forward direction of travel to clean the floor surface, wherein the one end of the towline is connected to the front of the extraction machine and wherein the towline is configured for being supported by the operator at the opposite end thereof at a height substantially greater than the height at which the one end of the towline is connected to the front of the extraction machine such that the towline angles upward from the extraction machine upon tensioning of the towline, whereby the tension in the towline further applies a lifting force to the front of the extraction machine, the extraction machine being configured such that the lifting force applied to the front of the machine urges the recovery system down against the floor surface being cleaned.

2. An extraction machine as set forth in claim 1, wherein the tow assembly further comprises a belt adapted for being worn about the operator's waist, the opposite end of the towline being connected to the belt.

3. The extraction machine as set forth in claim 2, where the belt having male and female quick-disconnect couplings for releasably securing the belt about an operator's waist where the male quick-disconnect coupling has resilient snap-in prongs for insertion in the female quick disconnect couplings.

4. An extraction machine as set forth in claim 1, wherein upon tensioning of the towline the towline angles upward from the front of the extraction machine at angle in the range of about 1° to about 50°.

5. An extraction machine as set forth in claim 1, further comprising a handle generally at the front of the extraction machine for being grasped by the operator while pulling the extraction machine in the forward direction of travel, the one end of the towline being connected to the front of the extraction machine below the handle.

6. An extraction machine as set forth in claim 1, wherein the one end of the towline is connected to the front of the extraction machine at a height above the floor surface in the range of about sixteen to about thirty-six inches.

7. An extraction machine as set forth in claim 1, wherein the towline is releasably connected to the extraction machine.

8. An extraction machine as set forth in claim 1, wherein the towline is pivotally connected to the extraction machine.

9. A method of towing an extraction machine of the type used for cleaning a floor surface, the extraction machine having a front, a rear, a cleaning solution dispenser capable of dispensing a cleaning solution onto the floor surface, and a recovery system for extracting a dirty solution from the floor surface, the extraction machine being movable relative to the floor surface in a forward direction of travel to clean the floor surface, the cleaning solution dispenser being nearer the front of the extraction machine than the recovery system such that as the extraction machine is moved over a segment of the floor surface in the forward, direction of travel the cleaning solution dispenser passes over the segment and dispenses cleaning solution onto the floor surface to promote the removal of dirt therefrom and the recovery system subsequently passes over the segment of floor surface to extract dirty solution from the floor surface, the method comprising:

connecting one end of a towline to the front of the extraction machine;

supporting an opposite end of the towline above the floor surface; and pulling the opposite end of the towline generally in the forward direction of travel of the extraction machine to thereby tension the towline, the tension in the towline applying a pulling force to the extraction machine for towing the machine in the forward direction of travel thereof, wherein the connecting step comprises connecting the one end of the towline to the front of the extraction machine at a height above the floor surface, and wherein the supporting step comprises supporting the opposite end of the towline at a height above the floor surface substantially greater than the height at which the one end of the towline is connected to the extraction machine whereby upon pulling the opposite end of the towline generally in the forward direction of travel the towline is tensioned to angle upward from the front of the extraction machine to apply a lifting force to the front of the extraction machine, the lifting force urging the recovery system down against the floor surface as the extraction machine is moved in the forward direction of travel.

10. A method as set forth in claim 9, wherein the supporting step further comprises connecting the opposite end of the towline to a belt and securing the belt around an operator's waist, the pulling step being performed by the operator moving generally in the forward direction of travel of the machine.

11. The method as set forth in claim 10, where the belt having male and female quick-disconnect couplings for releasably securing the belt about an operator's waist where the male quick-disconnect coupling has resilient snap-in prongs for insertion in the female quick disconnect couplings.

12. A method as set forth in claim 10, wherein the extraction machine further comprises a handle generally at the front of the machine, the connecting step further comprising connecting the towline to the front of the extraction machine at a location below the handle.

13. A method as set forth in claim 11, further comprising the step of grasping the handle of the extraction machine while pulling the opposite end of the towline generally in the forward direction of travel.

14. A tow assembly for use by an operator to pull an extraction machine of the type used for cleaning a floor surface, the tow assembly comprising a towline adapted for being pivotally connected at one end thereof to the extraction machine and for being supported by an operator at an opposite end of the towline, the towline being configured such that pulling the opposite end of the towline generally in a forward direction of travel of the extraction machine tensions the towline whereby tension in the towline applies a pulling force to the extraction machine for towing the machine in the forward direction of travel, wherein the towline is configured for being supported by the operator at the opposite end thereof at a height substantially greater than the height at which the one end of the towline is connected to the front of the extraction machine such that the towline angles upward from the extraction machine upon tensioning of the towline, whereby the tension in the towline further applies a lifting force to the front of the extraction machine, the extraction machine being configured such that the lifting force applied to the front of the machine urges the recovery system down against the floor surface being cleaned.

15. A tow assembly as set forth in claim 14, further comprising a belt sized for encircling the operator's waist, the opposite end of the towline being connected to the belt.

16. A tow assembly as set forth in claim 14, in combination with a connecting assembly for pivotally connecting the one end of the towline to the extraction machine, the connecting assembly being adapted for mounting on the extraction machine.

* * * * *

UNITED STATES PATENT AND TRADEMARK OFFICE
CERTIFICATE OF CORRECTION

PATENT NO. : 6,968,594 B2
DATED : November 29, 2005
INVENTOR(S) : Sean A. Cheatham et al.

It is certified that error appears in the above-identified patent and that said Letters Patent is hereby corrected as shown below:

Column 3,
Line 64, delete "in corp rated" and replace with -- incorporated --.

Column 6,
Line 61, delete "therapy" and replace with -- the strap --.
Line 63, delete "the" and replace with -- this --.

Column 7,
Line 67, after "extraction" insert -- machine weight supported by the wheels 25, which are nearer the front of the machine. Consequently, the amount of weight supported by the vacuum shoe 55 of the recovery system 53, which is nearer the rear of the machine, is increased, causing the vacuum shoe to be urged more forcefully down against the floor surface to facilitate the suctioning of dirty solution from the floor surface.
It will be seen that by connecting the towline 105 to the belt 103 worn around the operator's waist, the operator need only walk in the forward direction of travel to pull the machine. The operator is not required to pull the machine with his or her arms. Rather, the pulling force with which the operator pulls the extraction machine is generated primarily by the operator's legs. As a result, fatigue of the operator's arms, shoulders and back is decreased.
When introducing elements of the present invention or the preferred embodiment(s) thereof, the articles "a", "an" and "the" are intended to mean that there are one or more of the elements. The terms "comprising", "including" and "having" are intended to be inclusive and mean that there may be additional elements other than the listed elements.
As various changes could be made in the above constructions without departing from the scope of the invention, it is intended that all matter contained in the above description or shown in the accompanying drawings shall be interpreted as illustrative and not in a limiting sense.

Signed and Sealed this

Twenty-first Day of February, 2006

JON W. DUDAS
*Director of the United States Patent and Trademark Office*